United States Patent [19]

Kawakami

[11] Patent Number: 5,301,417
[45] Date of Patent: Apr. 12, 1994

[54] METHOD FOR PRESSING ARMATURE SHAFT INTO AXIAL HOLE

[75] Inventor: Yasushi Kawakami, Kiryu, Japan

[73] Assignee: Mitsuba Electric Mfg. Co., Ltd., Gunma, Japan

[21] Appl. No.: 980,986

[22] Filed: Nov. 24, 1992

[30] Foreign Application Priority Data

Nov. 29, 1991 [JP] Japan .................. 3-317077

[51] Int. Cl.⁵ ........................... H02K 15/02
[52] U.S. Cl. ...................... 29/598; 29/525; 29/732
[58] Field of Search ........... 29/598, 525, 732, 736, 29/733; 310/42

[56] References Cited

U.S. PATENT DOCUMENTS 4,944,085 7/1990 Lautner et al. .................. 29/598 X
5,220,721 6/1993 Thierry .......................... 29/598

Primary Examiner—Carl E. Hall
Attorney, Agent, or Firm—Darby & Darby

[57] ABSTRACT

A method and a pressing apparatus for pressing an armature shaft into an axial hole formed on an approximately cylindrical core, so as to protrude the shaft from the specified end face of the core at the specified protrusion dimension. A gage base is provided in which a shaft through hole of the same dimension as the specified protrusion dimension is formed. The core is placed on the gage base with the specified end face facing down. The shaft is first pressed into the axial hole to protrude it downward from a lower face of the shaft through hole. Next, the shaft is pushed back upward until a shaft push back portion reaches the gage base, thereby, protruding the shaft form the specified end face of the core at the specified protrusion dimension.

1 Claim, 5 Drawing Sheets

METHOD FOR PRESSING ARMATURE SHAFT INTO AXIAL HOLE

BACKGROUND OF THE INVENTION

1. Field of the Invention

The present invention relates to a method for protruding an armature shaft from the specified end face of a core specified dimension when pressing the armature shaft into an axial hole of an approximately cylindrical shaped core, which is one of the component members of the armature, and a pressing apparatus for the same.

2. Background Art

FIG. 5 shows a core 2 which is one of the component members of an armature which is a rotating portion for such a motor. The core 2 comprises a plurality of thin silicon steel plates (thickness: approximately 0.35 to 1.00 mm) laminated to form an approximately cylindrical shape and has a plurality of slot 2c formed around its peripheral surface. An axial hole into which an armature shaft 1 (hereafter referred to as the shaft 1) is pressed and mounted, is formed at a shaft center P of the core 2 and the openings of the axial hole are formed at upper and lower end faces of the core 2. Furthermore, a recess portion 2d is formed coaxially with the axial hole into a cubical shape at the desired depth at one end face 2b of the core 2.

The diameter of the shaft 1 is approximately equal to the bore of the axial hole and a plurality of grooves are formed in the axial direction on the peripheral surface of the shaft 1. Furthermore, because the length of the shaft 1 is longer than that of the core 2, both ends 1a and 1b of the shaft 1 protrude from the respective end faces of the core 2.

One end 1a of the shaft 1 protrudes out a distance from the opposite end face 2a of the core 2 not having the recess portion 2d at a dimensional tolerance X range of $-0.1 \text{ mm} < X < 0$ of the specified distance. Hereafter, the end face 2a will be referred to as a specified end face 2a. Because a connection body (not shown) for engaging with other rotating members (not shown) is molded on with resin at the end 1b of the shaft 1, protruding from the end face 2b into which the recess portion 2d is formed, a protrusion dimension of the shaft 1 from the end face 2b of the core 2, moreover, its dimensional tolerance are not specified in particular. Hereafter, the end face 2b will be referred to as the molded end face 2b.

The above-mentioned conventional method for pressing the shaft 1 into the axial hole of the core 2, is carried out by using a conventional pressing apparatus using operated by such means as hydraulic drive in the following way. The shaft 1 is inserted into the axial hole from the side of the molded end face 2b and a pressing portion of the pressing apparatus presses the shaft 1 into the axial hole while alternating repeated pressing and stopping motions and measuring the protrusion of the shaft 1 from the molded end face 2b until the specified protrusion dimension is reached. When the protrusion dimension of the shaft 1 from the molded end face 2b becomes equal to the specified dimension, a protrusion dimension of the shaft 1 from the specified end face 2a is deduced therefrom.

However, in the above-mentioned conventional method for press fitting the shaft, because the pressing and measuring motions are repeated alternately, the assembly operation is time consuming and inefficient and a mechanism and a controlling method of the pressing apparatus is complex. Furthermore, since the specified dimensional tolerance Y of the whole length of the shaft 1 pressed into the axial hole of the core 2 is in the range of $-0.2 \text{ mm} < Y < +0.2 \text{ mm}$, which is larger than the above-mentioned dimensional tolerance X concerning the protrusion of the shaft 1 from the specified face 2a, the use of the above-mentioned conventional pressing method make it difficult to confidently assume the protrusion dimension.

SUMMARY OF THE INVENTION

In consideration of the above, it is an object of the present invention to provide a method for pressing an armature shaft into an axial hole of a core and a pressing apparatus for the same, which are capable of performing a pressing operation promptly to protrude the armature shaft from the specified end face of the core high accurately at the specified dimension without complex mechanism and control of apparatus and further, without the necessity of measuring the dimension concerning the protrusion of the armature shaft.

To satisfy this object, the present invention provides a method for pressing an armature shaft into an axial hole in a cylindrical-shaped core so as to protrude said armature shaft from a specified end face of said core at a specified protrusion dimension, said method comprising:

(a) placing said core with said armature shaft therein on a gage base so that said specified end face faces downward, said gage base being provided with a shaft through hole of a depth equal to said protrusion dimension;

(b) descending a core pressing portion, disposed above said gage base, to press down said armature shaft into said axial hole via a pressing body while restricting the vertical movement of said pressing body with a temporary fixing part disposed on the lower portion of said pressing portion;

(c) stopping the descent of said core pressing portion, when a lower face of said core pressing portion makes contact with an upper end face of said core, thus protruding an end portion of said armature shaft from a lower face of said gage base through said shaft through hole;

(d) releasing the fixation of said temporary fixing part; and (e) raising a shaft push back portion, disposed below said gage base, to press said end portion of said armature shaft back upward until an upper end face of said shaft push back portion makes contact with said lower face of said gage base.

According to such a method, the core is located on the gage base with the specified end face down. Next, the core pressing portion descends to press the shaft into the axial hole while the vertical movement of the pressing body is restricted by the temporary fixing portion. When the lower end portion of the shaft protrudes downward from the lower face of the gage base, the shaft push back portion rises and the lower end portion of the shaft is pushed back until the end face of the shaft is level with the lower face of the gage base. Accordingly, the shaft protrudes at the specified dimension from the specified end face of the core.

Consequently, it is capable of performing a pressing operation promptly and efficiently to protrude the armature shaft from the specified end face of the core at the specified dimension.

Moreover, the present invention provides a pressing apparatus for pressing an armature shaft into an axial hole in a cylindrical-shaped core having said armature shaft therein, so as to protrude said armature shaft from a specified end face of said core at a specified protrusion dimension, said pressing apparatus comprising:

(a) a gage base having a central through hole of a depth equal to said protrusion dimension, for placing said core so that said specified end face faces downward and said axial hole of said core lies coaxially with said armature shaft through hole;

(b) a core pressing portion, disposed above said gage base to press said armature shaft into said axial hole by contacting an upper end face of said core with a lower face of said core pressing portion;

(c) a pressing body, disposed on the lower central region of said core pressing portion and connected operatively with said core pressing portion via temporary fixing part which restricts the vertical movement of said pressing body; and (d) a shaft push back portion, disposed below said gage base, for pressing said armature shaft back upward until an upper end face of said shaft push back portion makes contact with a lower face of said gage base.

According to such a structure, without complex mechanism and control of apparatus and further, without the necessity of a measuring of the dimension concerning the protrusion of the shaft as the conventional art, the pressing operation of the shaft is completed only with pressing and push back operations of the shaft using simple component members with high accurately.

In addition, according to the present invention, in the case where the dimensional accuracy concerning the whole length of the shaft pressed into the axial hole of the core is not very needed, it can confidently assume the protrusion dimension of the shaft from the specified end face.

DETAILED DESCRIPTION OF THE PREFERRED EMBODIMENTS

Figure 1:
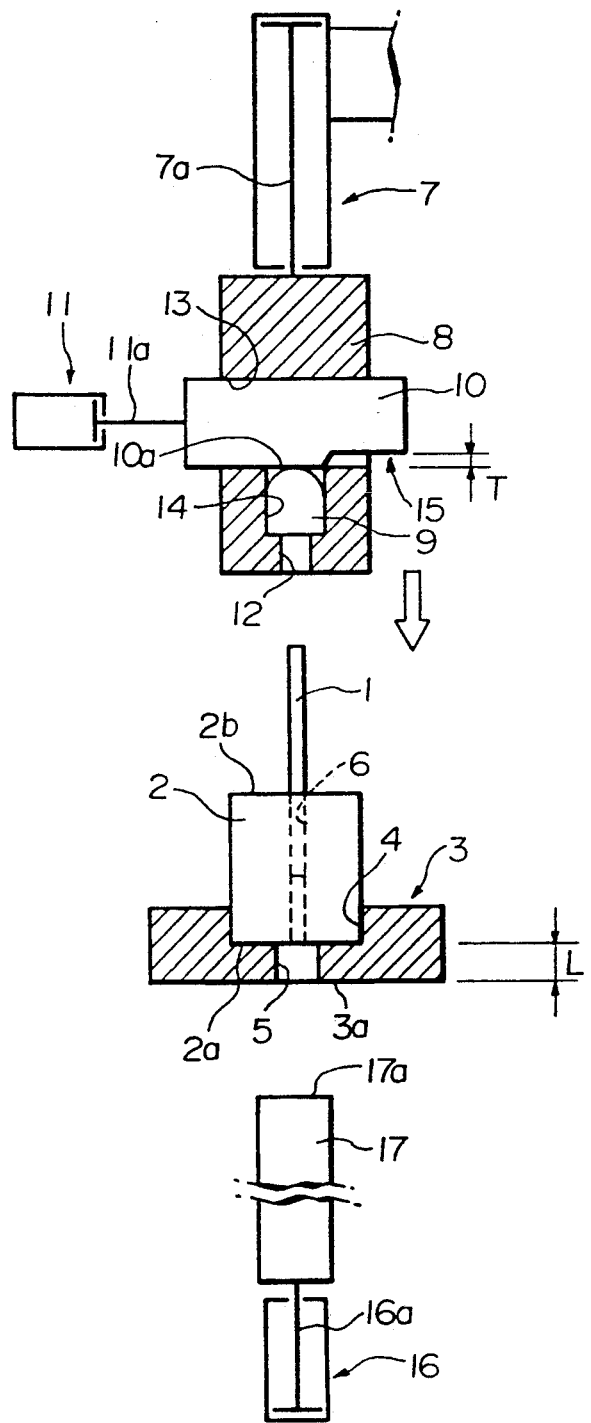
FIG. 1 shows a state before an armature shaft is pressed into an axial hole according to the preferred embodiment of the present invention.
Figure 5:
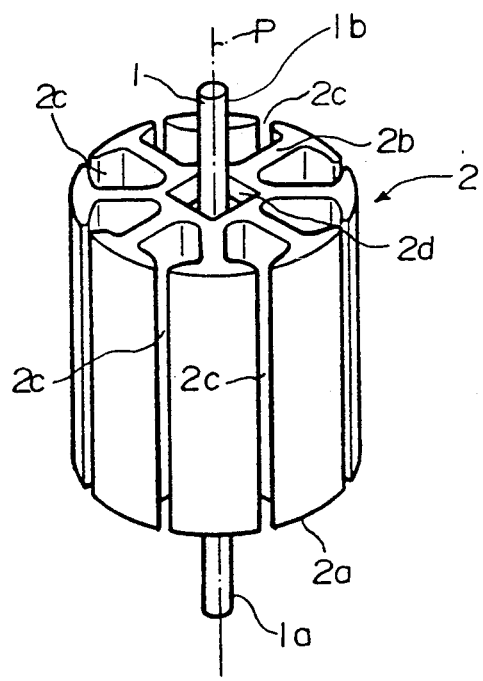
FIG. 5 is an oblique view of a core 2 and a shaft 1 composing the armature.

The present invention will be explained with reference to FIGS. 1 through 4. In FIGS. 1 through 4, components which correspond to those shown in FIG. 5 will retain the same reference numerical, and their description will not be repeated. In FIG. 1, a gage base 3 is a support jig on which a core 2 for pressing a shaft 1 in is placed. On an upper face of the gage base 3, a counterbore hole 4 of a desired depth is formed, whose diameter is slightly lager than that of the core 2. A shaft through hole 5 is formed coaxially with the counterbore hole 4, and has upper and lower openings at an underside of the counterbore hole 4 and at a lower face of the gage base 3, respectively. The thickness L forming the shaft through hole 5 on the gage base 3 is the same dimension as the above-mentioned protrusion dimension of the shaft 1 from the specified end face 2a of the core 2. The shaft through hole 5 is formed at the same dimensional tolerance as the above-mentioned dimensional tolerance X of the range of $-0.1 \text{ mm} < X < 0$. The core 2 is inserted into the counterbore hole 4 with the axial hole 6 vertically so that the specified end face faces downward.

Moreover, a core pressing portion 8 is provided above the gage base 3. The core pressing portion 8 is a cylindrical shaped member and its upper end portion connects to a pressing cylinder 7. The core pressing portion 8 descends toward the molded end face 2b of the core 2 in response to a pressure by the pressing cylinder 7 so as to press the molded end face 2b of the core 2 located on the gage base 3. The core pressing portion 8 includes a pressing body 9 which presses the shaft 1 into the axial hole 6, a temporary fixing part 10 which controls the movement of the pressing body 9 along a vertical direction, and a fixing cylinder 11 which operates on the temporary fixing portion 10.

A shaft hole 12 is formed coaxially with an opening at the center of the lower end face at the lower part of the core pressing portion 8. In the core pressing portion 8, a cylinder through hole 13 is formed orthogonally to the axis. A mounting hole 14 is formed between the shaft hole 12 and the cylinder through hole 13. The mounting hole 14 has openings at an inside of the shaft hole 12 and at the cylinder through hole 13, respectively. The diameter of the mounting hole 14 is larger than that of the shaft hole 12. At the inside of the mounting hole 14, the pressing body 9 is disposed movable vertically.

The pressing body 9 is a cylindrical shaped body and its diameter is slightly smaller than that of the mounting hole 14 and its height equals that of the mounting hole 14. A lower end face of the mounting hole 14 is flat and its upper end face is formed at a spherical shape. The temporary fixing portion 10 which restricts or enables the vertical movement of the pressing body 9, is provided on the inside of the cylinder through hole 13.

The temporary fixing portion 10 is a cylindrical shaped member having a slightly smaller diameter than the bore of the cylinder through hole 13, and is slidable on the inside of the cylinder through hole 13. A notch portion 15 is formed at the tip and along the axis of the temporary fixing portion 10. The fixing cylinder 11 connects to the end of the temporary fixing portion 10 not having the notch portion 15.

When a rod stroke 11a of the fixing cylinder 11 is extended, an peripheral surface 10a of the temporary fixing portion 10 contacts an upper face of the pressing body 9, thereby, the vertical movement of the pressing body 9 in the inside of the mounting hole 14 is restricted. In contrast, when the rod stroke 11a of the fixing cylinder 11 is contracted, the notch portion 15 of the temporary fixing portion 10 moves to an upper part of the mounting hole 14, thereby, the pressing body 9 becomes movable vertically within the height T of the notch portion 15. The height T of the notch portion 15 is set so as to be greater than the protrusion dimension of the shaft 1 when the shaft 1 is protruded from the lower face 3a of the gage base 3.

A shaft push back portion 17 which connects to a push back cylinder 16 at its lower part, is provided below the gage base 3. The shaft push back portion 17 is formed as a cylindrical shape and its upper end face is formed flat. When a rod stroke 16a of the push back cylinder 16 is extended, the upper end face 17a of the shaft push back portion 17 contacts with a rim of the shaft through hole 5 at a lower face 3a of the gage base 3.

Hereinafter, a method for pressing the shaft 1 into the axial hole 6 of the core 2 using a pressing apparatus having the above described construction, will be explained. As shown in FIG. 1, the core 2 is located first on the counterbore hole 4 on the gage base 3 with the specified end face 2a downward. The shaft 1 is inserted temporarily into the opening of the axial hole 6 from the side of the molded end face 2b.

Next, the core pressing portion 8 provided above the gage base 3, descends in response to an operation of the pressing cylinder 7. At this time, because the upper end portion of the pressing body 9 located in the inside of the core pressing portion 8 is fixed by the peripheral surface 10a of the temporary fixing portion 10, the vertical movement of the pressing body 9 is restricted. Then, the lower face of the pressing body 9 makes a contact with the upper end portion of the shaft 1 passed through the shaft hole 12, and as the core pressing portion 8 descends further, the shaft 1 is pressed gradually into the axial hole 6. When the lower face of the core pressing portion 8 contacts the molded end face 2b of the core 2, the pressing cylinder 7 stops. Accordingly, the core pressing portion 8 presses and fixes the core 2 on the gage base 3, and as shown in FIG. 2, the shaft 1 pressed into axial hole 6 protrudes further downward from the lower face 3a of the gage base 3.

Figure 2:
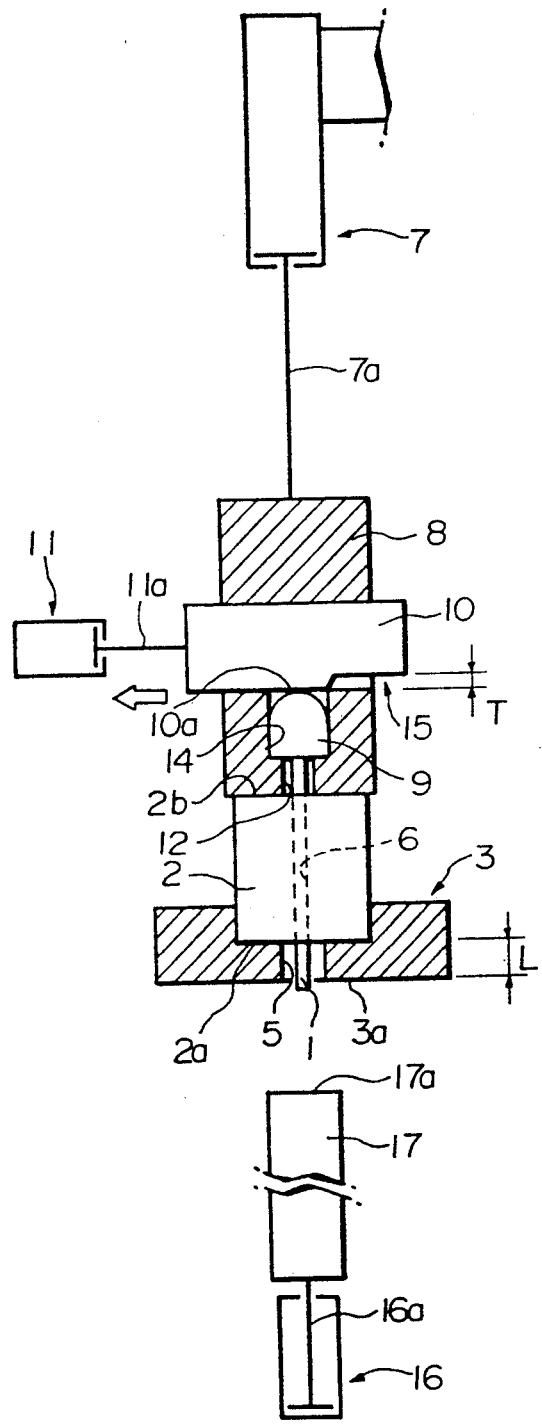
FIG. 2 shows a state in which the armature shaft has been pressed into the axial hole according to the preferred embodiment of the present invention.
Figure 3:
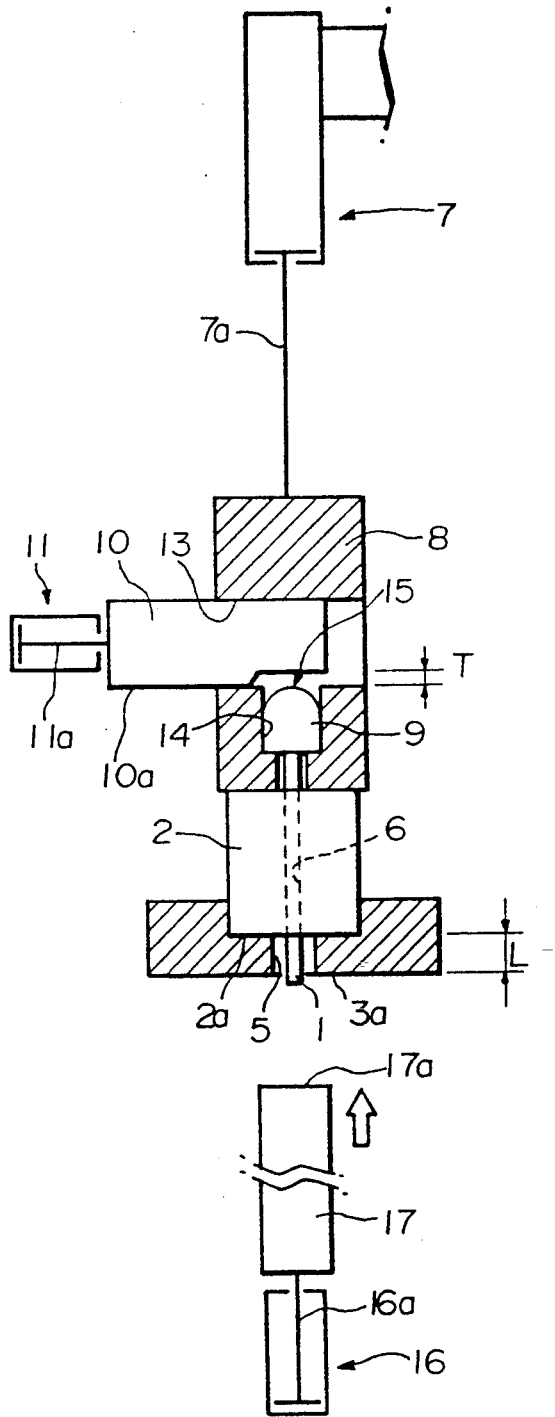
FIG. 3 shows a state which the armature shaft pressed into the axial hole is protruded downward from a lower face of a gage base according to the preferred embodiment of the present invention.
Figure 4:
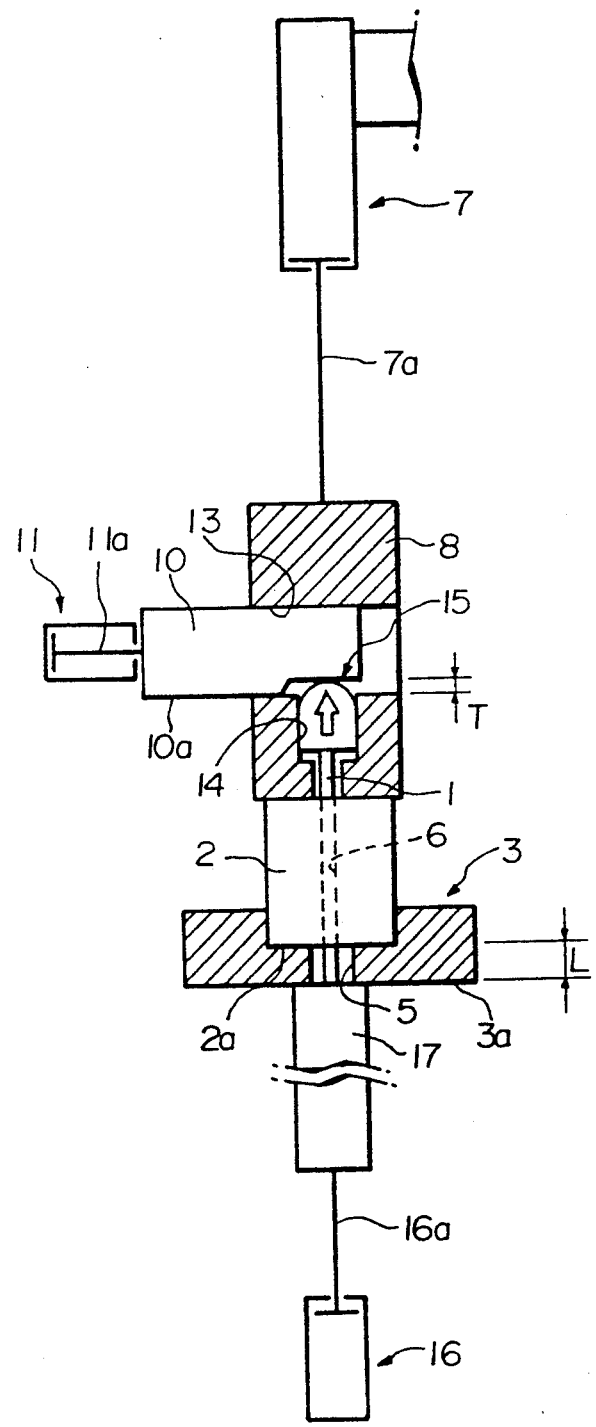
FIG. 4 shows the state which the armature shaft pressed into the axial hole is pushed back upward according to the preferred embodiment of the present invention.

Next, by lowering the pressure of the pressing cylinder 7 the pressure pressurizing the temporary fixing portion 10 is reduced, and the rod stroke 11a of the fixing cylinder 11 is contracted, thus moving the temporary fixing portion 10 toward the direction of the arrow shown in FIG. 2. Next, the pressing cylinder 7 is pressurized again to press the core 2 and fix it on the gage base 3 via the core pressing portion 8. Accordingly, as shown in FIG. 3, because the notch portion 15 is now located at the upside of the pressing body 9, the pressing body 9 becomes movable vertically within the height T of the notch portion 15.

Next, the rod stroke 16a of the push back cylinder 16 is extended, the shaft push back portion 17 located below the gage base 3 rises while pushing the shaft 1 back by its upper face 17a. When the upper face 17a of the pressing cylinder 7 makes a contact with a rim of the shaft through hole 5, the push back cylinder 16 stops. Accordingly, the lower end portion of the shaft 1 protruding downward beyond the lower face 3a of the gage base 3, is pushed back until the end face of the shaft 1 is level with the lower face 3a of the gage base 3. Because the thickness L of the gage base 3 forming the shaft through hole 5 is formed at the same dimension as the above-mentioned protrusion dimension of the shaft 1 from the specified end face 2a of the core 2, and at the same dimensional tolerance as the above-mentioned dimensional tolerance X, the shaft 1 protrudes at the specified dimension L from the specified end face 2a of the core 2.

As being understandable easily based on the above description, in the method for pressing the shaft 1 into the axial hole 6 of the core 2 and the pressing apparatus for the same according to the preferred embodiment of the present invention, the pressing operation is carried out as follows. The core 2 is located on the gage base 3 with specified end face 2a down. Next, the core pressing portion 8 descends to press the shaft 1 into the axial hole 6 while the vertical movement of the pressing body 9 is restricted by the pressing cylinder 7. When the lower end portion of the shaft 1 protrudes downward from the lower face 3a of the gage base 3, the shaft push back portion 17 rises and the lower end portion of the shaft 1 is pushed back until the end face of the shaft 1 is level with the lower face 3a of the gage base 3. Accordingly, the shaft 1 protrudes at the specified dimension L from the specified end face 2a of the core 2.

Consequently, the method and the apparatus are capable of performing a pressing operation promptly to protrude the armature shaft from the specified end face 2a of the core 2 high accurately at the specified dimension. According to the preferred embodiment of the present invention, without complex mechanism and control of apparatus and further, without the necessity of a measuring of the dimension concerning the protrusion of the shaft 1, the pressing operation of the shaft is completed only with pressing and push back operations of the shaft 1 using simple component members.

In the preferred embodiment of the present invention, if the height T of the notch portion 15 of the temporary fixing portion 10 and the thickness L of the gage base 3 are changed appropriately, it is capable of dealing with various dimensions of the shaft 1 protruding from the specified end face 2a.

What is claimed is:

1. A method for pressing an armature shaft into an axial hole in a cylindrical-shaped core so as to protrude said armature shaft from a specified end face of said core at a specified protrusion dimension, said method comprising:
    (a) placing said core with said armature shaft therein on a gage base so that said specified end face faces downward, said gage base being provided with a shaft through hole of a depth equal to said protrusion dimension;
    (b) descending a core pressing portion, disposed above said gage base, to press down said armature shaft into said axial hole via a pressing body while restricting the vertical movement of said pressing body with a temporary fixing part disposed on the lower portion of said pressing portion;
    (c) stopping the descent of said core pressing portion, when a lower face of said core pressing portion makes contact with an upper end face of said core, thus protruding an end portion of said armature shaft from a lower face of said gage base through said shaft through hole;
    (d) releasing the fixation of said temporary fixing part; and
    (e) raising a shaft push back portion, disposed below said gage base, to press said end portion of said armature shaft back upward until an upper end face of said shaft push back portion makes contact with said lower face of said gage base.

* * * * *